Oct. 12, 1926.  
J. J. McELROY  
1,602,537  
AIR SPRING  
Filed July 22, 1922
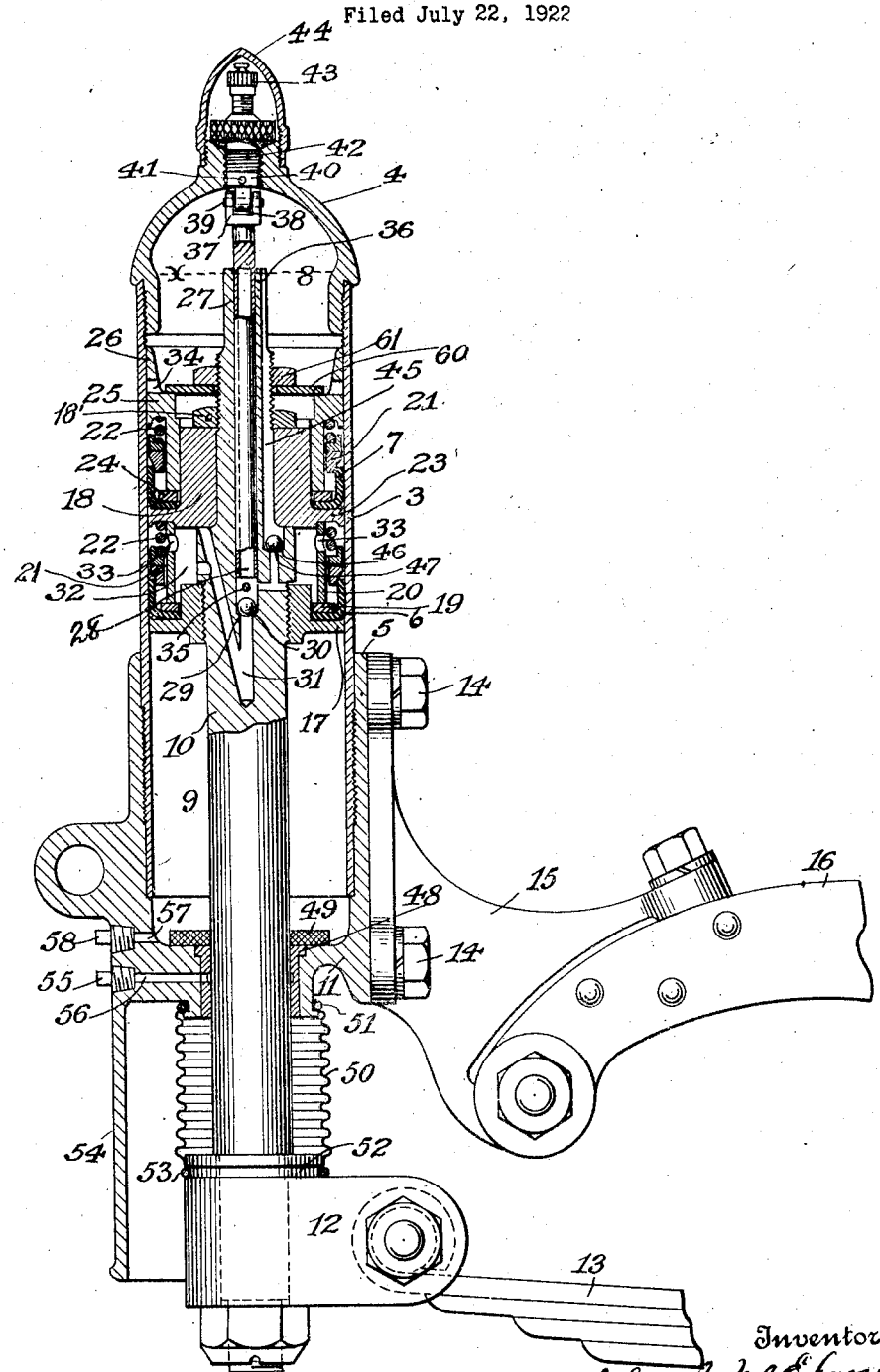
Inventor  
John J. McElroy  
By his Attorneys  
Cooper Kerr & Dunham Patented Oct. 12, 1926.

1,602,537

UNITED STATES PATENT OFFICE.

JOHN J. McELROY, OF NEW HAVEN, CONNECTICUT, ASSIGNOR TO THE WESTINGHOUSE AIR SPRING COMPANY, OF NEW HAVEN, CONNECTICUT, A CORPORATION OF PENNSYLVANIA.

AIR SPRING.

Application filed July 22, 1922. Serial No. 576,654.

This invention relates to hydro-pneumatic devices.

The present invention is embodied in a fluid compression device adapted for use as a compression spring broadly applicable in any relation where two bodies are so associated that resilient support of one is desirable, and a general object in view in this application is to embody the principle of resilient support by an elastic compression medium, such as air, in a commercially practical self-contained air-tight compression device adapted to serve all of the purposes and functions of a spring, and comprises the utilization (1) of a fluid tight joint between sliding surfaces of the device, said joint being maintained tight by means of a liquid seal, (2) of successive annular packings for the sliding joint between the plunger and the cylinder, (3) of a pump having its intake connected up to the space between said packings for withdrawing sealing liquid from between the packings and for returning it to the load supporting cushion chamber, one of the pump elements being carried by one of the relatively movable members forming a part of the cushion chamber, and another of the pump elements being carried by the other of the relatively movable members forming the cushion chamber.

According to the present invention, which is, broadly applicable for use as a spring for motor vehicles (which hereinafter without any idea of limiting the invention will be referred to as an air spring) a pump of such character is utilized that under no conditions of operation will air be forced thereby into the variable volume cushion chamber of the air spring.

A further object of this invention is to provide an effective rebound check so that extreme extension movements of the air spring will be cushioned without shock or jar.

A still further object is to provide a relatively cheap, simple air spring of the direct acting type in which the oil or other lubricant is present in such small quantity as to function only to maintain the liquid seals requisite to effective operation of the device as distinguished from the devices of those patents in which the sealing liquid is caused to surge through a constriction in the plunger head during the extension and compression movements of the air spring.

A still further object is to provide a simple, rugged air spring construction in which a flexible boot may be readily utilized for protecting the exposed sliding surfaces from dust, etc.

The single figure of the drawings is a sectional elevation of a front air spring embodying this invention.

The device consists of a suitable length of tubing 3, to the upper end of which a dome shaped head 4 is threaded and to the lower end of which a cup-shaped casting 5 is threaded.

A piston or plunger carrying two annular cup-shaped packings 6 and 7 is arranged to slide within tubing 3 and divides the interior of the air spring into a variable volume load supporting cushion chamber 8 and a rebound or recoil check chamber 9.

A piston rod 10, carries the piston or plunger and projects through bottom 11 of the air spring and by means of a suitable connector 12 is connected to the front end of one of the front leaf springs 13 of the vehicle (in the case of front springs) while cup-shaped member 5 which forms the lower portion of the air spring is formed for suitable connection by means of bolts 14 to a bracket 15 which, in turn is formed for attachment to one front horn 16 of the vehicle frame.

The piston of the air spring preferably consists of a lower annular nut or base 17 threaded onto the piston rod and an upper annular nut or follower 18 held onto the upper end of the piston rod. These two nuts 17 and 18 form supports for the cup packings 6 and 7 and their outer peripheries are preferably finished so as to form bearing surfaces adapted to slide on the inner surface of cylinder 3. Packing 6 is held in place on nut 17 by means of an annular washer 19 and a tubular retainer 20, which is held in place by cylindrical nut 18. The free edge of each of the cupped packings is pressed against the inner wall of cylinder 3 by means of cone expanders 21, 21 and helical springs 22, 22. Cupped packing 7 is held in place on annular flange 23 of annular nut 18 by means of an annular washer 24 and sleeve 25. Sleeve 25 fits over said annular nut 18 and is held in position thereon and against said packing retaining washer 24 by means of the washer 60 which rests on the top of sleeve 25 and by the nut 61 which is threaded to piston rod 10 and against said washer 60. This sleeve 25 is formed with a relatively long cylindrical bearing surface 26.

Piston rod 10 is provided with an upper extension 27 and this, as well as a portion of the rod below the same is drilled to form a pump barrel 28. A valve seat 29 for a ball valve 30 is formed in the bottom of the pump barrel and a duct or channel 31 connects the pump barrel with the space 32 inside of tubular packing retainer 20. This retainer is provided with a number of oil holes 33 near its upper edge and the space between this tubular retainer and the wall of cylinder 3 below holes 33 serves as an oil retaining chamber for maintaining a constant oil seal for the free edge of cup packing 6.

Oil ducts 34 extend through flange 26 of the piston. A pin 35 extends through the piston rod above ball valve 30 and retains the valve at the lower end of the pump barrel.

A partially tubular piston 36 constituting a wall for pump barrel 28, is secured to head 4 of the device and is reciprocable within the pump barrel 28 and this piston at its upper end carries a formed member 37 to receive a joint piece 38 and is loosely joined thereto by a pin 39. The joint piece 38, in turn, is loosely joined to the bottom 40 of the air valve housing by a pin 41 and at a right angle to the pin 39, the members 37, 38, 39, 40 and 41 constituting a universal joint of rugged construction, so that by virtue of the employment of this mechanism the piston 36 is self-centering with relation to the pump-barrel 28. The housing 40 is securely held in place in the dome 4 by a screw thread 42 the housing being drilled and tapped to receive an ordinary tire valve indicated at 43, the usual top cap piece being shown at 44.

An oil channel, 45, is drilled on one side of the piston rod 10 and extends from the pump barrel 28 upward along the rod 10 and communicating with the chamber 8. In the channel 45 a valve seat 46 and a ball valve 47 is provided and the reciprocation of the piston 36 pumps the trapped oil from the pump barrel 28 into the cushion chamber 8 at appropriate times of pressure difference between said barrel and said chamber 8, thus recovering and restoring to the chamber 8 any oil lost through leakage and insuring the indefinite maintenance of the liquid seals at the cup washers 6 and 7 with a minimum normal charge of oil as will be apparent.

A flanged bushing 48 formed suitable bearing metal is placed within the central opening of bottom member 11 and serves as a bearing for the piston rod 10.

An annular buffer 49 formed of some suitable soft material loosely surrounds piston rod 10 and rests on the bottom of recoil chamber 9. A flexible boot 50 at its upper end is secured to a lower annular projection on the bottom member of the spring by means of a retaining ring or wire 51 while the lower end of the boot is secured to an upwardly extending annular flange 52 of connector 12 by means of a retaining ring or wire 53.

A dust guard 54 is on the lower end of bottom member 11 and near its top is pierced to receive and oiling plug 55 which is threaded within a tapped hole near the bottom of the device. An oil duct 56 leads from this oiling plug through bushing 49 to the piston rod and a drain duct 57 leads from the bottom of recoil chamber 9 and is normally closed by oiling plug 58.

Normally the cushion chamber 8 will be filled with suitable oil to the level marked "X" and during operation of the air spring oil which leaks past packing 7 will collect within the annular chamber above packing 6. Any surplus which flows through openings 33 in the tubular packing retainer 20 will flow into annular chamber 32 and from there will pass to the inlet duct 31 of the oil pump. Upon extension and compression movements of the air spring, this oil will be pumped back to the cushion chamber 8 of the device.

It will be understood that the device will be initially charged with the required amount of air under pressure through valve 43 and the air pumped through valve 43 will flow into the cushion chamber 8 of the device.

The pump, on account of this tubular piston 36 is of such a low volumetric efficiency that no air will be forced into the cushion chamber 8 during any operating conditions that the air spring may be subjected to.

It will be understood that if desired instead of having chamber 9 below the piston substantially air-tight for the purpose of forming a recoil check, a conical shaped helical spring having its base resting on the bottom of the cylinder and its apex terminating short of the piston with the piston in mid position, may be utilized as a recoil check.

Oil ducts 34 render any oil in cushion chamber 8 available as sealing liquid for high pressure packing 7.

Having thus described my invention, what I claim is:—

1. In a vehicle spring, a cylinder, a piston dividing the cylinder into a cushion chamber on one side and a rebound check chamber on the other side, a rod extending from said piston through the bottom of said cylinder, a packing for the joint between said piston and cylinder, a liquid collecting chamber on the low pressure side of said packing, a pump barrel carried by said rod and a hollow plunger connected to said cylinder and having a discharge valve located adjacent its lower end.

2. In a vehicle air spring, a cylinder, a piston dividing the cylinder into a cushion chamber on one side and a rebound check chamber on the other side, a rod extending from said piston through the bottom of said cylinder, a packing for the joint between said piston and cylinder, a liquid collecting chamber on the low pressure side of said packing, a pump barrel carried by said rod and a hollow plunger connected to said cylinder and having a discharge valve and opening in the wall of said piston and rod and communicating with the cushion chamber.

3. In a vehicle air spring, relatively movable members forming two closed chambers of variable volumetric capacity one of which chambers is air tight, and the pressures in which act in opposition, successive annular packings for the sliding joint between said members, and a pump positively operated by the movement of said members for transferring liquid internally from the lower side of one of said sliding joints into the chamber above the sliding joint.

4. In a vehicle air spring, a cylinder provided with top and bottom members, a piston, a rod extending from said piston through the bottom of said cylinder and with said piston dividing the cylinder into an airtight cushion chamber and a relatively tight rebound check chamber, successive annular packings for said piston, and a pump having one element carried by said cylinder and the other element carried by said piston and having its inlet communicating with the space between said packings and its outlet located in the bottom of said cushion chamber.

5. In a vehicle air spring, a cylinder, top and bottom members for said cylinder, a piston slidable within said cylinder, a rod extending from said piston through the bottom member and with said piston dividing said cylinder into an upper cushion chamber and a lower rebound check chamber, successive annular packings carried by said piston between said chambers, a pump barrel carried by said piston, a hollow pump plunger carried by the top member, a valved inlet passage leading from the space between said packings to said pump barrel, a pump outlet valve in said piston and an opening above said valve into the cushion chamber.

In testimony whereof I hereto affix my signature.

JOHN J. McELROY.